United States Patent
Koselka et al.

(10) Patent No.: US 7,765,780 B2
(45) Date of Patent: Aug. 3, 2010

(54) AGRICULTURAL ROBOT SYSTEM AND METHOD

(75) Inventors: Harvey Koselka, Trabuco Canyon, CA (US); Bret Wallach, San Diego, CA (US)

(73) Assignee: Vision Robotics Corporation, San Diego, CA (US)

( * ) Notice: Subject to any disclaimer, the term of this patent is extended or adjusted under 35 U.S.C. 154(b) by 510 days.

(21) Appl. No.: 11/009,909

(22) Filed: Dec. 9, 2004

(65) Prior Publication Data

US 2005/0126144 A1 Jun. 16, 2005

Related U.S. Application Data

(60) Provisional application No. 60/481,781, filed on Dec. 12, 2003.

(51) Int. Cl.
 *A01B 69/00* (2006.01)
(52) U.S. Cl. .................... 56/10.2 A; 701/50
(58) Field of Classification Search ............. 56/10.2 R, 56/10.2 F, 327.1, 328.1, DIG. 15, 10.2 A–10.2 D; 460/7; 701/50
 See application file for complete search history.

(56) References Cited

U.S. PATENT DOCUMENTS

| | | | | |
|---|---|---|---|---|
| 4,482,960 | A * | 11/1984 | Pryor | 701/28 |
| 4,519,193 | A * | 5/1985 | Yoshida et al. | 56/328.1 |
| 4,663,925 | A * | 5/1987 | Terada | 56/328.1 |
| 4,769,700 | A * | 9/1988 | Pryor | 348/120 |
| 4,975,016 | A * | 12/1990 | Pellenc et al. | 414/501 |
| 4,994,970 | A * | 2/1991 | Noji et al. | 701/25 |
| 5,185,991 | A * | 2/1993 | Klinner | 56/128 |
| 5,438,817 | A * | 8/1995 | Nakamura | 56/10.2 A |
| 5,560,190 | A * | 10/1996 | Ottaway | 56/327.1 |
| 5,859,696 | A * | 1/1999 | Nicholas et al. | 356/128 |
| 5,957,304 | A * | 9/1999 | Dawson | 209/552 |
| 5,974,348 | A | 10/1999 | Rocks | |
| 6,052,647 | A | 4/2000 | Parkinson et al. | |
| 6,199,000 | B1 | 3/2001 | Keller | |
| 6,374,538 | B1 | 4/2002 | Morris et al. | |
| 6,415,229 | B1 | 7/2002 | Diekhans | |
| 6,517,281 | B1 | 2/2003 | Rissi | |
| 6,525,276 | B1 | 2/2003 | Vellidus et al. | |
| 6,608,672 | B1 | 8/2003 | Shibusawa et al. | |
| 6,671,582 | B1 * | 12/2003 | Hanley | 700/245 |
| 6,915,197 | B2 * | 7/2005 | Van der Lely | 701/50 |

* cited by examiner

*Primary Examiner*—Alicia M Torres
(74) *Attorney, Agent, or Firm*—ARC IP Law, PC; Joseph J. Mayo

(57) ABSTRACT

Robotic harvesting of agricultural crops. Robot moves through a field first to "map" the field to determine plant locations, number and size of fruit on plants and approximate positions of fruit on each plant. Once the map of the fruit is complete, the robot can plan and implement an efficient picking plan for itself or another robot. A scout robot or harvest robot determines a picking plan in advance of picking a tree. This may be done if the map is finished hours, days or weeks before a robot is scheduled to harvest, or if the picking plan algorithm selected requires significant computational time and cannot be implemented in "real time" by the harvesting robot as it is picking the field. The system harvests according to the selected picking plan. The picking plan may be generated in the scout robot, harvest robot or on a server.

19 Claims, 9 Drawing Sheets

Scout

Harvester

Scout

Harvester

Hand

AGRICULTURAL ROBOT SYSTEM AND METHOD

This patent application takes priority from U.S. Provisional Patent Application Ser. No. 60/481,781 to Koselka et al., entitled "Robot Mechanical Picker" filed Dec. 12, 2003 which is hereby incorporated herein by reference.

BACKGROUND OF THE INVENTION

1. Field of the Invention

Embodiments of the invention described herein pertain to the field of robots. More particularly, but not by way of limitation, embodiments of the invention enable robotic harvesting of agricultural crops.

2. Description of the Related Art

The use of robots to automate tasks performed by people is increasing. Robots provide several important benefits over human labor including improved efficiency, less expense, more consistent and higher quality work performed, and the ability to perform hazardous work without endangering people. Individually and collectively, these benefits help businesses increase margins and profits, which is essential for maintaining competitiveness.

Agriculture is one industry with traditionally low profit margins and high manual labor costs. In particular, harvesting can be expensive. For some crops, such as tree fruit, harvesting labor represents the growers' single largest expense, up to 50% of total crop cost. Increasing labor costs and shortages threaten the economic viability of many farms. Therefore, replacing manual labor with robots would be extremely beneficial for harvesting.

GPS controlled automated tractors and combines already operate in wheat and other grain fields. Automated harvesters exist that can blindly harvest fruit by causing the fruit to drop from a plant into a collection device. For example, Korvan Industries, Inc. makes equipment than shakes oranges, grapes, raspberries, blueberries, etc. off plants. These harvesting approaches have wide scale applicability, but are not applicable to the harvesting of all crops.

For example, while oranges may be harvested en mass by shaking the tree, this method only works for the fruit that will be processed. Shaking cannot be used for picking oranges sold as fresh, i.e. table fruit. The violent nature of this harvesting technique can bruise the fruit and tear the skin, which is both unappealing to the consumer and causes the fruit to rot quickly.

Thus, whole tree harvesting approaches comprising "shaking," are inappropriate for picking fresh fruits and vegetables such as apples, pears, tomatoes and cucumbers that are to be sold as whole fruit. A different approach is required, one in which each piece of fruit is picked individually.

People have attempted to develop mechanical pickers to pick whole fruits for years. For example, Pellenc, a French manufacturer, built a prototype orange picker, but abandoned the project. One common failure mode for these picking systems was that they could not locate fruit located on the inside of the tree that cannot be seen from outside the canopy. To date, no equipment exists that can pick fresh fruits and vegetables efficiently enough to compete with human labor in cost or yield.

BRIEF SUMMARY OF THE INVENTION

Embodiments of the invention comprise a system and method that enable robotic harvesting of agricultural crops. One approach for automating the harvesting of fresh fruits and vegetables is to use a robot comprising a machine-vision system containing rugged solid-state digital cameras to identify and locate the fruit on each tree, coupled with a picking system to perform the picking. Due to the wide application for a robot harvester, otherwise known herein as a harvest robot or harvester robot, the following terms may be used interchangeably and their usage is not meant to limit the intent of the specific design feature: plants and trees; fruits and vegetables; and fields, orchards and groves. In one embodiment of the invention a robot moves through a field first to "map" the field to determine plant locations, the number and size of fruit on the plants and the approximate positions of the fruit on each plant. A robot employed in this embodiment may comprise a GPS sensor to simplify the mapping process. A camera or cameras on the arm or arms of the robots may be mounted in appropriately shaped protective enclosures so that they can be physically moved into the canopy of the plant if necessary to map the fruit locations from inside the canopy. Once the map of the fruit is complete for a field, the robot can plan and implement an efficient picking plan.

In one embodiment of the invention, a harvesting robot determines a picking plan in advance of picking a tree. This may be done if the map is finished hours, days or weeks before the robot is scheduled to harvest, or if the picking plan algorithm selected requires significant computational time and cannot be implemented in "real time" by the harvesting robot as it is picking the field. If the picking algorithm selected is less computationally intense, the harvester may calculate the plan as it is harvesting. The system harvests according to the selected picking plan.

A harvester robot comprises a self-propelled automated platform with one or more articulating picking arms. Each arm may include one or more cameras and/or an embedded processor to accurately locate and reach each piece of fruit/vegetable, and a "hand" to grab and pick the fruit. A hand as used herein may comprise any mechanical device capable of picking a fruit. The hand may contain a mechanism to cut or snip the fruit from the stem rather then just pulling it free. The system may comprise two or more different style arms incorporated into the harvester in order to reach the fruit on different parts of the tree. The harvester may pull or carry loading bins, into which it may load the picked fruit. Harvest bins may comprise any device that is capable of holding picked fruit such as a basket, a bushel, a box, a bucket or any other agricultural fruit repository.

One aspect of this approach is that it pre-maps the individual vegetable locations on the plant and optionally pre-plans a picking sequence. Without this map and optional plan, the robot harvesting system operates significantly less efficiently; slowing the harvesting by a factor of up to four or more and potentially leaving more unpicked fruit on the tree. The plan determines an efficient picking strategy, but not the exact arm motions for picking each vegetable.

Using oranges as an example, the picking robot is provided a map comprising the number and approximate locations of oranges in each specific region of the tree. An embodiment of the picking plan algorithm provides the direction for the robot to locate itself or another robot near the tree, determines which arms to use in each tree region and specifies the optimal picking order for the fruit in that region. Since the orange locations are not static, i.e. they move in the wind and rise as other oranges are picked from the same branches, each picking arm may include one or more cameras. The arm may be pointed in the direction of the next orange to pick, or may use its own vision based guidance system to locate and pick that orange. When the oranges are arranged in a cluster, the robot may pick the closest orange in the cluster, even if it is not the one for which it was initially programmed. Because the robot may pre-map the grove and know how many oranges are in the cluster, the picking plan may include all the arm motions required to pick all the fruit in the cluster.

While a single robot may encompass the entire harvesting system, one or more embodiments of the invention use multiple robots for example a low cost scout robot and one or more harvester robots. One advantage of this embodiment is that the scout can map and create the harvesting plan in advance of the picking robots arriving at the plant. This enables each harvester robot to work continuously, improving the efficiency of each harvester robot. Because the scout can be relatively low cost with respect to the harvester, the overall cost effectiveness of the system is achieved by utilizing the more expensive picking robots continuously.

DETAILED DESCRIPTION OF THE INVENTION

Figure 1:
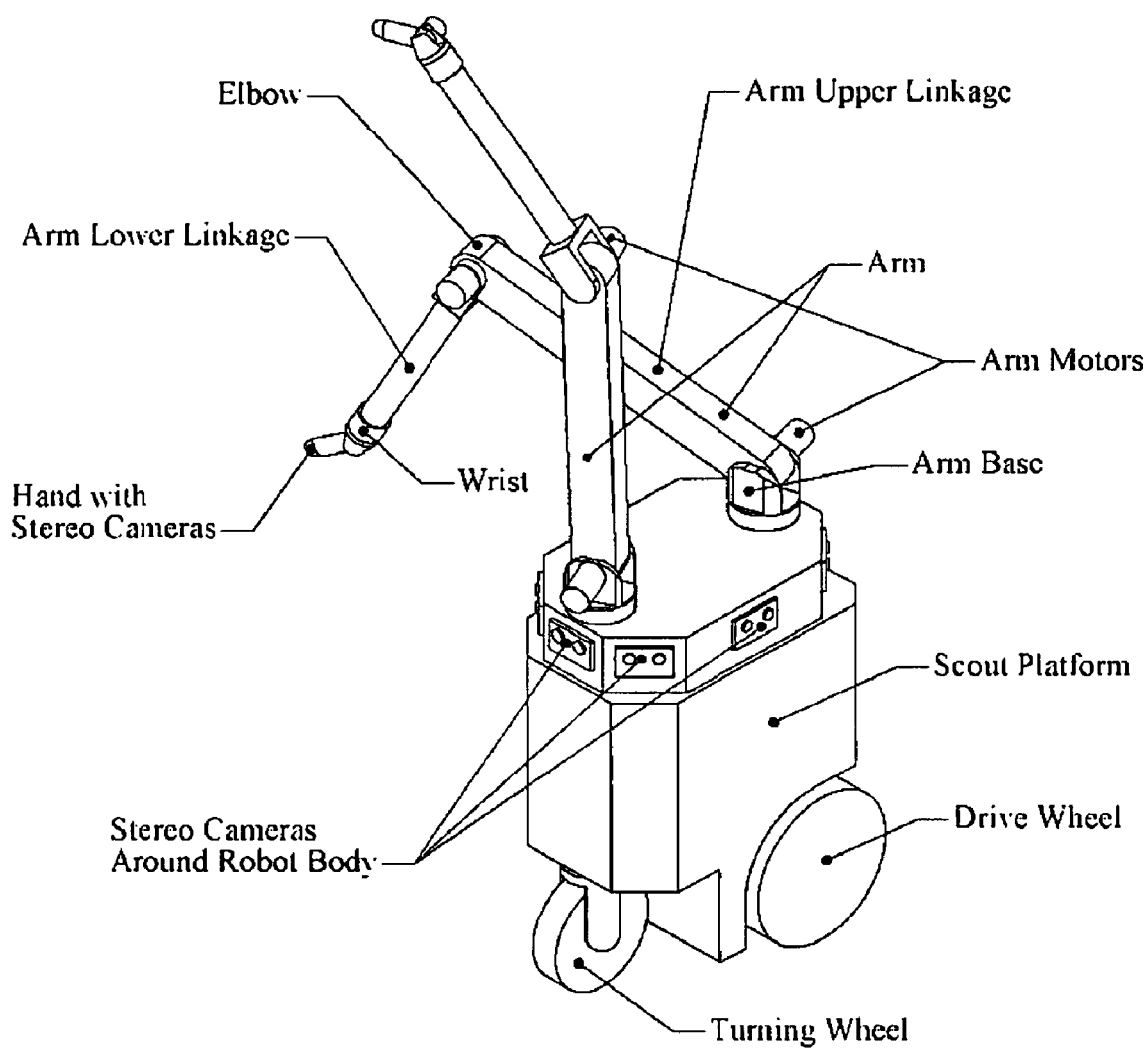
FIG. 1 illustrates an embodiment of a scout robot.

Embodiments of the invention comprise a system and method that enable robotic harvesting of agricultural crops. One approach for automating the harvesting of fresh fruits and vegetables is to use a robot comprising a machine-vision system containing rugged solid-state digital cameras to identify and locate the fruit on each tree, coupled with a picking system to perform the picking. In one embodiment of the invention a robot moves through a field first to "map" the field to determine plant locations, the number and size of fruit on the plants and the approximate positions of the fruit on each plant. A robot employed in this embodiment may comprise a GPS sensor to simplify the mapping process. At least one camera on at least one arm of a robot may be mounted in appropriately shaped protective enclosure so that a camera can be physically moved into the canopy of the plant if necessary to map fruit locations from inside the canopy. Once the map of the fruit is complete for a field, the robot can plan and implement an efficient picking plan for itself or another robot.

In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. Any mathematical references made herein are approximations that can in some instances be varied to any degree that enables the invention to accomplish the function for which it is designed. In other instances, specific features, quantities, or measurements well-known to those of ordinary skill in the art have not been described in detail so as not to obscure the invention. Readers should note that although examples of the invention are set forth herein, the claims, and the full scope of any equivalents, are what define the metes and bounds of the invention. Agricultural elements as used herein pertain to fruit, vegetables, branches, plants or trees, or any other item found in an agricultural field.

As discussed above, pre-mapping enables efficient picking. This map can be created either just before harvesting or earlier in the growing season. While navigating through the grove and mapping, the scout can gather other useful information including the condition, size, quantity, health and ripeness of the fruit, individual trees and the orchards as a whole. In another embodiment, the scout can be equipped with a variety of sensors, including but not limited to cameras, hydration sensors, spectral sensors or filters to sense changes in coloration of the leaves, bark or fruit. This database enables farmers to improve their yields. For example, this information may be used to:

- Selectively pick by sizes to optimize total crop price and profit.
- Track crop development during the growing season, yields per tree, sizes and locations, and compare with data taken in earlier years.
- Detect disease and insect/mite infestations during the growing season, identifying problems before they can be seen with the naked eye.
- Measure, map and geo-reference nutrient and hydration status on a tree-by-tree or area-by-area basis.
- Determine the amount and timing of watering, fertilizing and spraying for each individual plant in the field.

Over time, this informational database can be used to more accurately predict crop sizes and yields earlier in the growing season and to improve harvesting and marketing strategies. The ability to collect, analyze and report data on tree, grove and crop conditions significantly helps growers to increase both fruit quality and yields while decreasing the amount of water, fertilizer, insecticides and labor required.

Growers can initially send the scout through the grove anytime after the fruit is set on the trees. The data acquired by the scout, coupled with the historical data collected for that tree and grove may be used to determine everything from optimal pruning strategies to scheduling the harvest. If an unusual event, such as a frost, excessive rain, drought, high winds, etc., occurs the scout may be sent through the grove again to update the forecasts and picking strategies.

The harvesting system and method described herein comprises several advantages.

1. Pre-mapping the tree and the fruit location enables the robot to create an efficient picking pattern. Without a picking plan, it is unlikely the harvester can work efficiently enough to justify its cost relative to hand labor.
- A robot that arbitrarily picks the first piece it sees will have to significantly backtrack to pick all the fruit.
- A robot without a picking plan would attempt to pick a specific piece from its current location with the closest arm regardless of whether a different arm could pick it more easily from a different starting location.
- A robot that does not have a complete picking plan may not know when it is done and would possible utilize time consuming "last looks" around the tree to confirm that it has not missed anything.
- Without a picking plan, a robot harvester may not be able to quickly move multiple picking arms without the arms becoming entangled.

Mapping the fruit or vegetable locations facilitates creating an effective picking plan. The map can also include information such as the locations of thick branches the robot cannot move out of the way and, thus, must reach around. The map enables the robot to look at the picking from a holistic, entire tree view, and create a picking plan that is significantly more efficient than having the robot grab for the first piece it sees.

2. Pre-Planning the Picking

Once a tree is mapped, the robot system may determine an optimal picking strategy and create a picking arm motion plan and robot motion path, collectively known as a picking plan. Creating the picking plan may be either simple or complex from both computational and implementation standpoints. Computational complexity is based on how long it takes the robot to determine the picking plan once the map is complete. From an implementation standpoint, the optimization of the picking strategy may require several iterations to determine the relative optimum, and also require tightly controlled positioning and arm movements. A pre-planned picking pattern is especially important with the use of multiple picking arms on the robot. The plan enables each arm to work without interfering with others. The plan should also balance the actual harvesting between the arms in order to keep all of the arms picking as much as possible, which improves the overall picking speed and efficiency.

Depending on the complexity of the picking plan, the robots may create the picking plan in "real time" as the robot is harvesting. Alternatively, the robot may need to pre-plan the process to enable efficient harvesting. If the robot had mapped the field significantly before harvest, it may pre-plan the picking path at the completion of mapping rather than waiting until the actual harvest.

Below are listed two examples of different picking plan complexities.

Simple plan that can be created and implemented in real time:

Tomatoes grow on outside of relatively skinny plants, so there are a number of positions where a multiple linkage arm can easily reach all the fruit. For these plants, the robot may create a picking plan in real time as it is harvesting. The plan may include size or ripeness thresholds based on color or color pattern, such that only the ripe tomatoes are picked and the robot comes back the next day or week to pick the rest of the crop. Multi-spectral image analysis may be utilized by the system in order to determine whether a given piece of fruit is ripe or not, and the subtle differences in multi-spectral intensities of color may be preloaded into the robot for a given crop type.

Complex plan that may be completed before picking is initiated:

Orange trees are large, often up to 16 feet diameter and 16 to 20 feet tall, and the oranges can be located almost anywhere around the outside of the tree or inside the tree's canopy. Each tree may yield several hundred up to a thousand oranges, and as many as 50% of the oranges may be located inside the canopy, which is made up of clusters of oranges, leaves and twigs and thick and thin branches. When picking, the harvester's arms can push through the leaves and twigs that can be moved out of the way, but must work around the more mature branches.

This requires a relatively complex picking strategy and plan that takes a great deal into account. For example, the robot may need to position itself in one or more "optimal" locations around the tree in order to reach all the fruit. If the positioning is not carefully planned, the robot may need to reposition itself several times for each tree. Since each move slows the harvest, it is desirable to minimize the number of moves. A specific harvest order may also be required so the arms do not reach past and damage some fruit while reaching for other fruit. Finally, the plan may account for the accessible paths to reach the fruit inside the canopy.

There may also be situations where the robot can section the plant into different harvest regions and begin picking one region as it plans the next region. In one embodiment, the scout and harvester are in the field together with the scout mapping the tree one or more ahead of the tree the harvester is picking. In addition, the picking plan may comprise fruit specific picking times so that multiple passes through a field are utilized in order to pick each fruit at its optimum ripeness level.

3. Multiple Robot System, the Scout and Harvester

Using different robots to map and pick enables each to work optimally efficiently. In addition, each robot can be designed and sized appropriately for its individual task. Even if the overall system cost is greater, the two-robot system can be more cost effective because each part can work at its optimal speed and harvesting time for each grove reduced. This allows a two-robot system to harvest more trees in a season and thereby reduce the cost per tree.

4. Using the Scout Map at a Time Other than Just Before the Harvest

In a normal growing season, the number and relative positions of the fruit does not change significantly in the time leading up to the harvest. Therefore, the scout can map and plan before the harvester robot is in the field. This information enables the system to accurately predict crop yields and harvesting times, which, in turn, enables a more informed macro-level harvesting approach. In other words, with this knowledge, the farmer may change the order or the timing of the harvest (or harvests) of the fields in order to maximize his revenue for the entire crop. As noted earlier if an unusual event occurs, the scout may be sent out to remap the grove before harvest.

5. Using the Scout to Create a Database of Information Including, but not Limited to the Harvesting Plan As described above, the database may include the fruit size to enable efficient size picking if there is a premium for a particular size of fruit. The database would also be able to track the yields for individual trees to determine the more proficient, which may allow the farmer to alter the application of water, fertilizer and spray pesticides on individual trees. This would increase the overall yield, while minimizing the costs because the water and chemical applications are optimized for each individual tree. In addition, fruit may be culled early in the season in order to maximize the number of larger fruit that are obtained later at harvest time. When trees possess too many fruit, the average size of the fruit is smaller and there may be non-linear price differences in fruit counts per bushel that the farmer may opt to target in order to maximize profits.

The scout may also be equipped with sensors to detect disease and insect/mite infestations during the growing season, identifying problems before they can be seen with the naked eye. Different sensors may measure, map and georeference nutrient and hydration status.

6. The Use of Cameras or Stereo Camera Pairs on Each Mapping and Picking Arm

The CMOS cameras used today are extremely small, low cost and rugged. Therefore, it is possible to place several on the robot bodies and onto the robot arms. One problem is that the fruit is often located inside the canopy of the tree, out of sight from the outside. Therefore, the cameras on the robot body cannot see all of the oranges on a tree. By contrast, when the robot pushes its arms into the canopy, the cameras mounted on the arms are able to see the fruit on the inside of the tree.

In addition, mounting lights, such as small powerful LEDs, on the camera assembly may enable the robot to light the dark areas inside the tree, improving the systems' ability to see all the fruit. An embodiment of the invention comprises an air blower to blow the leaves away from the camera's line of sight in order to prevent the leaves from blocking the view of the fruit. A mounting light may emit one or more frequencies of light, one or more varying frequencies of light or one or more varying frequency bands of light either through use of LEDs or conventional lights and/or hardware or software filters to improve the ability of the system to see within dark areas or observe fruit with frequencies that although subtle to the human eye yield clues as to the ripeness of the fruit. One or more embodiments of the system may also use a refractometer to sample fruit juice to yield a brix reading to determine sugar percentage of the fruit. A fruit that is sample for sugar content may also be collected by the robot in order to bring back for further analysis and this may happen if the fruit appears diseased or has been damaged for example. Alternatively, a fruit may be left on the tree and mapped as having been sampled or as being damaged and dealt with at a later time.

As described above, a picking plan made in advance can be complete and comprehensive, but it is not exact. For example, if the scout mapped a week before harvesting, the plants and fruit will have continued to grow and may not be in the same exact location as when the map was created. Wind also causes the fruit to move, and a branch tends to rise as the weight of the fruit decreases as each piece is picked. Therefore, blindly moving the picking arm to the last known fruit location is not sufficient. Each time an arm reaches for a piece of fruit, the system must individually locate and move the arm to the precise location of that piece of fruit.

A stereo pair of cameras on the robots' housing may track the fruit if it is visible from the outside of the tree. However, it is at times more efficient to track the fruit using one or more cameras on the picking arm. The arm reaches inside the tree to pick the fruit, so the camera is able to see the pieces not visible from the outside. Additionally, it may be easier to control the arm using cameras that are closer to the fruit. This allows the robot to use less expensive and complex arms.

Finally, picking some fruits and vegetables requires cutting the stem rather than just grabbing and pulling the piece free. Having a camera near the hand is one possible way to ensure the robot can determine the fruit's orientation, locate the stem and position the cutting tool.

7. Combining Robot Harvesting with Traditional Hand Labor

For example, a robot harvester that only picks oranges located high in the canopy may be economically viable. Field observations have shown that human pickers harvest the lower portion of a tree (fruit that can be reached from the ground) four to ten times faster than they can harvest fruit from the tops of the trees, because continually re-positioning and climbing up and down ladders is a relatively slow process. Therefore, a Top Pick Harvester working in sequence with a small human crew may reduce both the cost and the harvesting time. The Top Picker approach may also require fewer, less complex and less expensive arms since it reaches into the tree from above and does not have to penetrate as far into the tree's interior.

8. Autonomous Selective Picking

A robot picker may efficiently pick fruit of a given size or ripeness to maximize crop value. The process of picking the fruit may be aided by multi-spectral sensing devices. This may involve multiple harvests and readjusting the map in the database to update the status of remaining fruit.

9. Harvesting Robot that Includes Secondary Operations to the Fruit

Some fruit is harvested with long stems such as some tomatoes. Other crops such as oranges require the stem cut flush with the fruit. Due to the location and orientation of the fruit on the tree, it may be difficult to properly cut the stem when the fruit is picked. One alternative is to pick the fruit by cutting the stem at any convenient length, and as fruit is transferred from the picking arm to the bin, a secondary process may be utilized to trim the stem to the proper length.

Similarly, the robot may include a washing or waxing station or virtually any other process to simplify or cost reduce any step of the process of getting the fruit from the field to the store.

10. Harvesting Robot that Senses Crop Conditions

As described above, the scout or harvester may include sensors to detect a variety of fruit, plant, soil, field or infestation conditions. Such a system provides significant economic benefits to the farmer.

11. Robot Harvesting System that Creates a Crop Database

The robot can create and maintain a database of information about the crop such as yield, size and ripeness. The database may also include any additional information regarding the crop as described in the previous paragraph above. The farmer can use the database to compare information between years, fields or even individual trees. This database enables farmers to tailor the application of fertilizer, pesticide and water to improve overall crop yield while minimizing cost.

12. Scout Robot Performs a Statistical Sampling of Crops

Prior to harvest, a grower often desires to know the potential yield and status of his crops. The scout may be used to sample a statistical number of plants in a single field or multiple fields. These samplings can then be used to determine the timing of harvest for the fields.

13. Alternative Embodiments

In another embodiment, the robot divides each tree into a number of regions and maps, plans and harvests the regions instead of the entire tree. For many crops this is less efficient, but works well for trees that are large enough that the harvester robot needs to re-position itself to reach the entire crop. In this embodiment, the robot may map one region of the tree while it is harvesting another region and continue in a similar manner until the entire tree is harvested. In a multi robot embodiment, two harvesters may navigate down adjacent rows of trees in a grove, and each harvest fruit from its own half of the trees it passes.

Depending on the orchard, or field, the robot harvester may be picking multiple trees at the same time. In addition to picking across the row as mentioned above, the harvester may pick multiple adjacent trees depending on the spacing and the robot size. This is especially efficient for some crops such as orange trees that are pruned into hedge where it is difficult to distinguish the branches of different trees.

Because the robot harvester may be wide relative to the rows between the plants, it may require some arms extended in front of the base to pick the fruit before the base is adjacent to the plant. Without these arms, the base may damage the fruit as it passes by or its presence may prevent the other arms from being able to reach the adjacent fruit.

FIG. 1 illustrates an embodiment of a scout robot. The scout robot comprises a platform shown as "Scout Platform". In addition to being the main robot frame and the base for arms wherein each arm is referenced in FIG. 1 as "Arm", the platform houses the main power components, which may comprise but is not limited to components such as an engine, generator, hydraulic pump, drive train and steering system. All other elements referenced herein in double quotes refer to elements of the respective figure in lieu of reference numbers for clarity. The platform may also house a computer, a communication device comprising a communications interface such as a cable connector or a wireless communication device and a GPS system. Two "Drive Wheels" may be utilized to propel the robot in one embodiment of the invention. The communications device may be utilized to couple with another robot or server in order to transmit a map of the fruit in a field. This transmission may involve a physical connection such as a cable or be performed via wireless communications. The two drive wheels may be driven independently via individual drive motors. Turning may be accomplished by spinning the drive wheels at different speeds or directions. A third wheel may be utilized as a "Turning Wheel", and may be implemented with a simple free wheeling caster or may be an independently driven wheel. Alternatively, a single engine may drive the drive wheels simultaneously. In this configuration, the turning wheel is free rolling along the ground but is rotated by a steering system along its axis perpendicular to the ground for steering.

Several stereo camera pairs may be located around the perimeter of the platform. These camera pairs are shown in FIG. 1 as "Stereo Cameras Around Robot Body". These cameras enable the robot to view a significant area at all times. The robot may use these cameras to navigate through the fields and to map the fruit and vegetables located near the outside of the plants. A robot may include one or more arms that can be moved into the plant to see the fruit that is not visible from the outside. These arms may also be used to map the fruit near the top or bottom of the plants.

One method for detecting the fruit is to move the arm back and forth outside of the plant. Optical flow algorithms may be used to detect the fruit during mapping. In this method, the cameras get multiple views of approximately the same portion of the tree from different angles. Viewing an area with slightly different perspective enables the system to determine whether objects move relative to each other in each image, and, thus, their relative locations. Using an optical flow algorithm allows for items inside the canopy to be viewed and mapped without having a direct view of the items at all times. This effect can be observed for example when moving past a picket fence and being able to piece together what is in the entire area behind the picket fence even when unable to do so if stationary in front of the fence. This enhances the systems ability to detect fruit and to determine the coordinates of each piece of fruit. Any other method of determining fruit locations is in keeping with the spirit of the invention.

The arms may include the minimum number of degrees of freedom to enable them to locate all the fruit on each crop. Each arm therefore may include a rotating base shown in FIG. 1 as "Arm Base" in which the upper arm linkage pivots. An elbow joint shown in FIG. 1 as "Elbow" may connect the upper and lower arm linkages and may pivot the lower linkage relative to the upper linkage. A "wrist" pivots and turns a hand relative to the lower arm linkage. The hand may include a small stereo camera pair encased in a protective housing and is shown as this embodiment in FIG. 1 as "Hand with Stereo Cameras". The housing is shaped such that it can be moved into and moved out of the canopy of the plant without engaging and significantly damaging either the plant or robot arm. The hand may also include a light to enable the robot to see the fruit within the dark interior of the plant. Each joint includes drive system that may be driven by at least one electric, pneumatic or hydraulic motor or other method such as pneumatic muscles. The motors can either be servos, stepper motors or any motor with position feedback such as encoders.

Optional arms containing one or more environmental sensors may be employed in the scout. These sensors may include moisture sensors, chemical sensors, spectral analysis subsystems, or other agricultural sensors that can be employed in the field to collect data on plant, soil, infestation or other conditions of interest to growers. The scout may position the arms as necessary to collect the samples needed to perform the analyses.

The internal computer and electronics may control the arm motors as well as navigate the scout through the field or a centralized server may be utilized in order to perform these functions. In addition, harvesters that are underutilized may be communicated via wireless protocols yielding a peer-to-peer architecture capable of maximizing the processing capability of all harvesters in range of communication. Alternatively wireless communications may be employed between a plurality of robots in order to allow robots with low computational loads to host processing for robots that have higher processing loads. In other words a robot mapping a tree with a small amount of fruit and branches may help a second robot that is currently mapping a heavily laden tree with computational efforts in order to maximize the effectiveness of the system as a whole.

Figure 2:
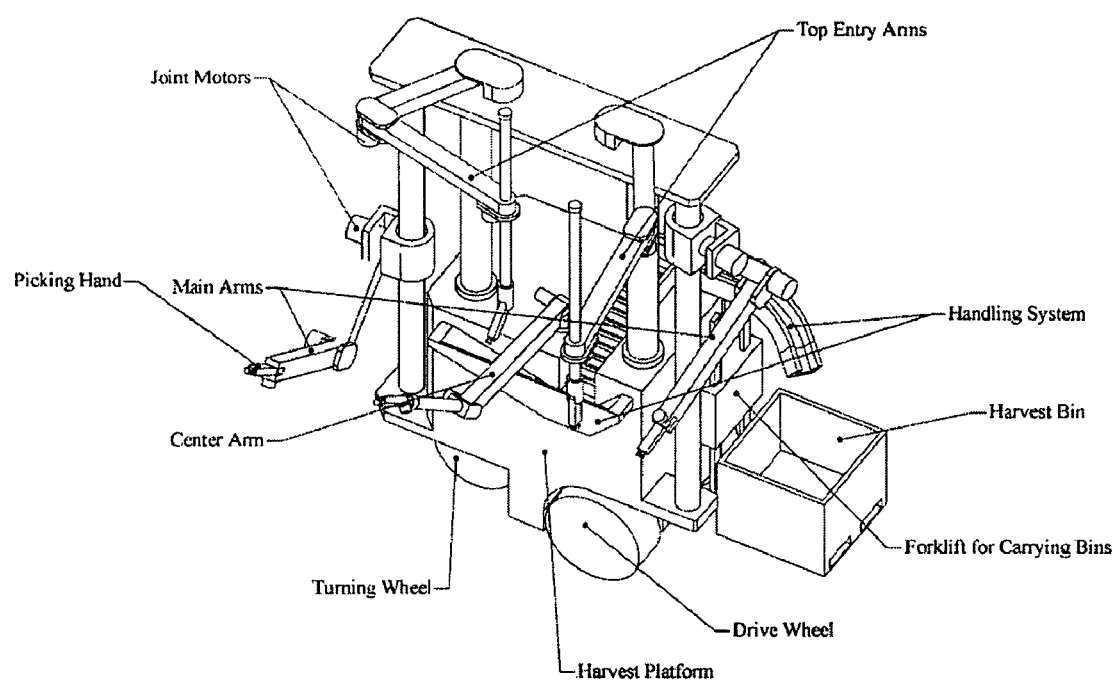
FIG. 2 illustrates an embodiment of a harvester robot.

FIG. 2 illustrates an embodiment of a harvester robot. A harvester robot may be larger than a scout robot. The harvester robot should be of a size that is large enough to allow the harvester robot to reach every piece of fruit in the field. Typically, crops are planted in parallel rows, so from a position next to the plant, the harvester typically is able to reach all the fruit on the half of the plant near the robot. A scout robot may morph into a harvester robot by coupling with at least one harvester bin or alternatively a harvester robot may be used to scout a field before picking.

Like the scout, the platform shown in FIG. 2 as "Harvest Platform" is the main robot body and may include an engine, generator, hydraulic pump, drive train, steering system and other power components. The platform also may house the computer, wireless communication device and a GPS system. The drive system may either incorporate two independently driven drive wheels, shown in the lower left of FIG. 2 as a "Drive Wheel", to propel the robot, or two simultaneously powered drive wheels or any other mechanism, which can move the robot including tracks or rails. The robot may also include a steering system and turning wheel or a free-wheel caster as appropriate in other embodiments of the invention. Note that all entities in double quotes in reference to FIG. 2 are found in the figure in lieu of reference numbers for ease of viewing by the reader.

The harvester robot may include multiple arms, some of which are specialized to pick certain portions of the plant. For example, "top entry arms" may reach into the plant from the top. A plurality of arms may be coupled with another arm or boom that moves independent of the plurality of arms. This enables the harvester to pick fruit at the top of the tree and to reach into the canopy from the top, which is often the least dense area. The "main arms" slide up and down and can pick the fruit anywhere from the ground to the top of the trees. Other arms, such as the "center arm", reach the most densely packed portion of the plant to speed the harvesting of those regions.

The arms configuration may be nested, where arms are mounted on other arms. For example, two picking arms can be mounted on the base arm hereafter called the boom. The boom might move to a position adjacent to a section of the tree and remain stationary as the picking arms harvest the fruit in that section. The boom is then moved to a new section of the tree and the picking arms harvest the new section. This configuration enables the picking arms, which move almost continuously, to be significantly shorter while still being able to harvest the entire tree.

The arm geometry is also affected by the design of the base platform. If the platform is wide, some arms must be located in front of the base in order to harvest the fruit that may either be damaged or blocked by the base platform when it is adjacent to the tree. Each arm has one or more degrees of freedom based on the specific requirements. Actuators, such as electric motors, servos and hydraulic or pneumatic cylinders, may be utilized for each degree-of-freedom (DOF) at each joint.

Figure 7:
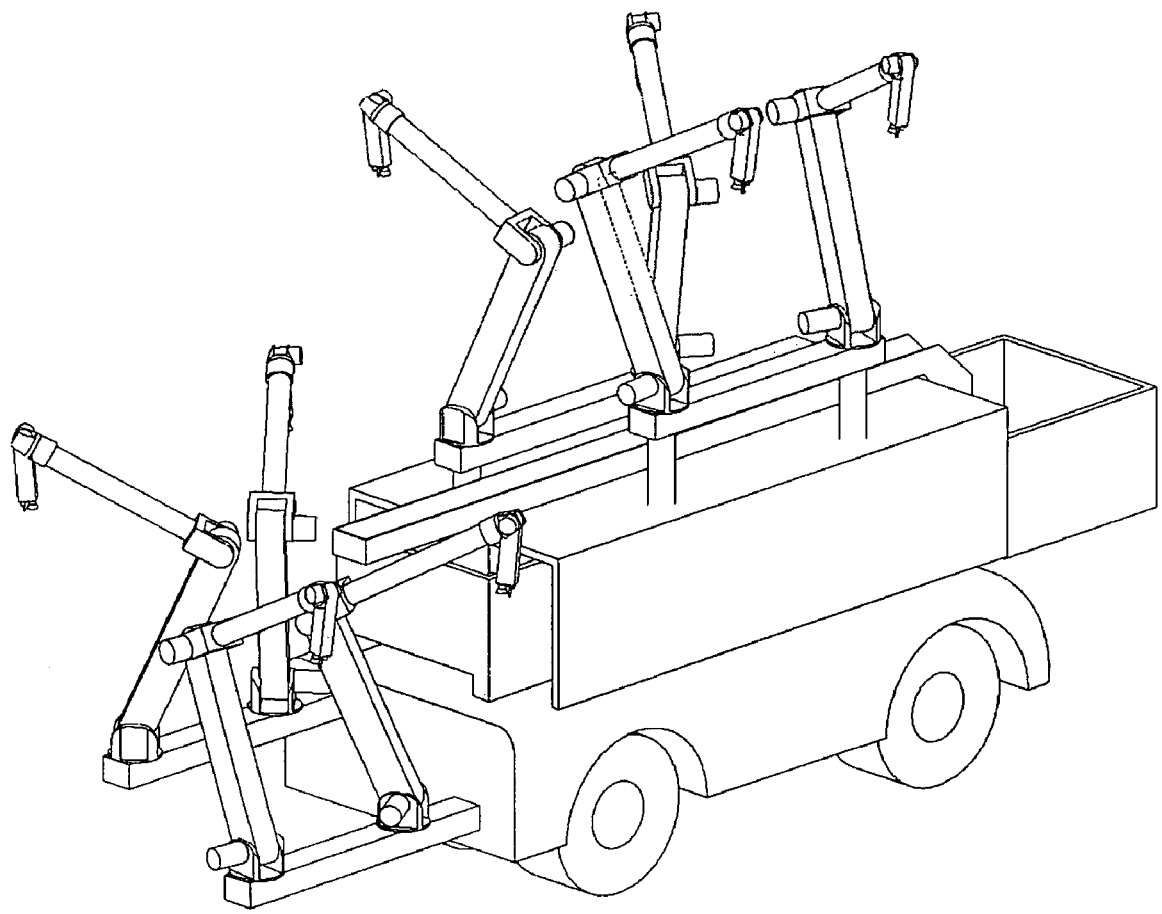
FIG. 7 illustrates an alternative embodiment of a harvester robot.
Figure 8:
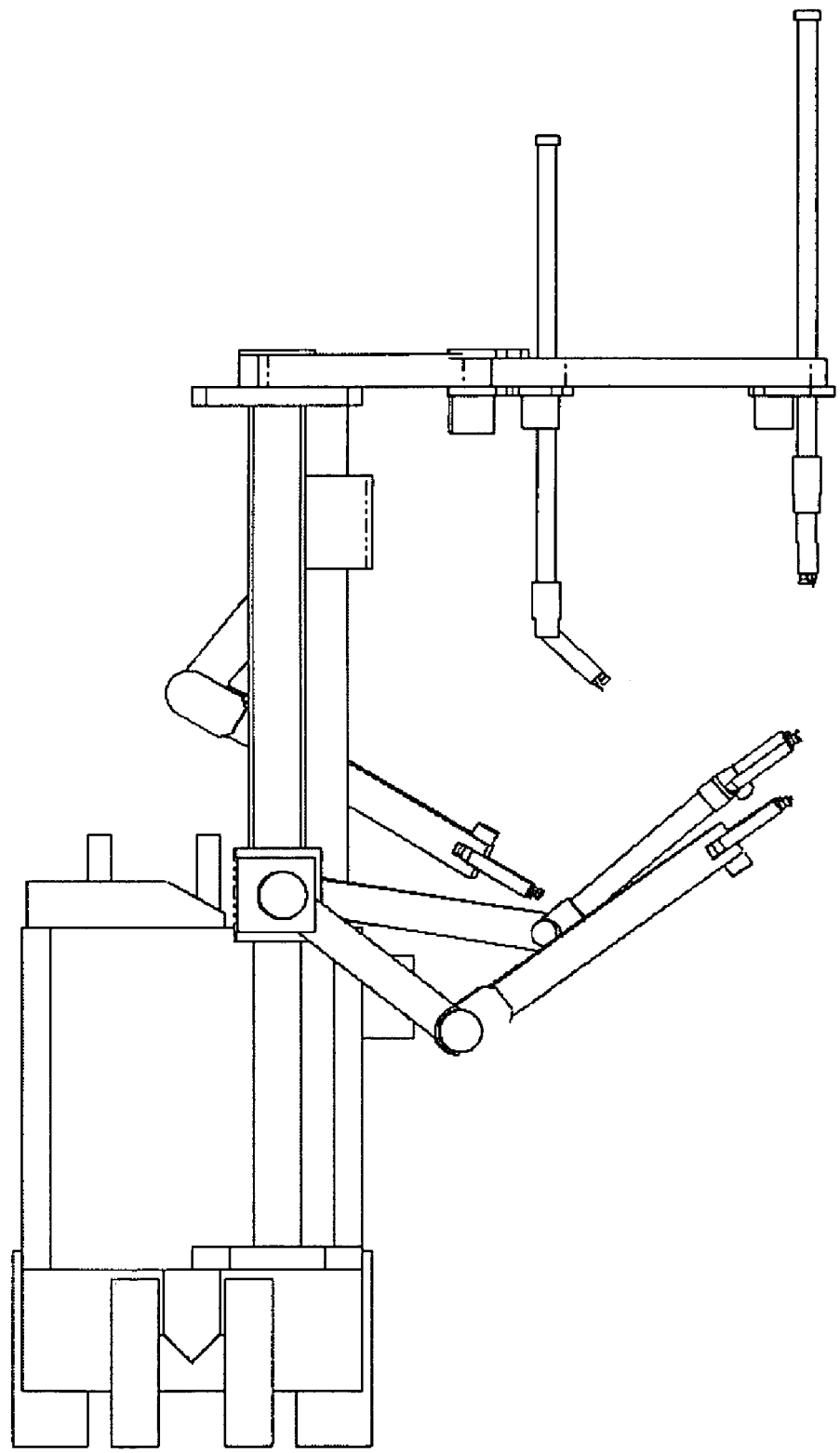
FIG. 8 illustrates a front view of an embodiment of a harvester robot.
Figure 9:
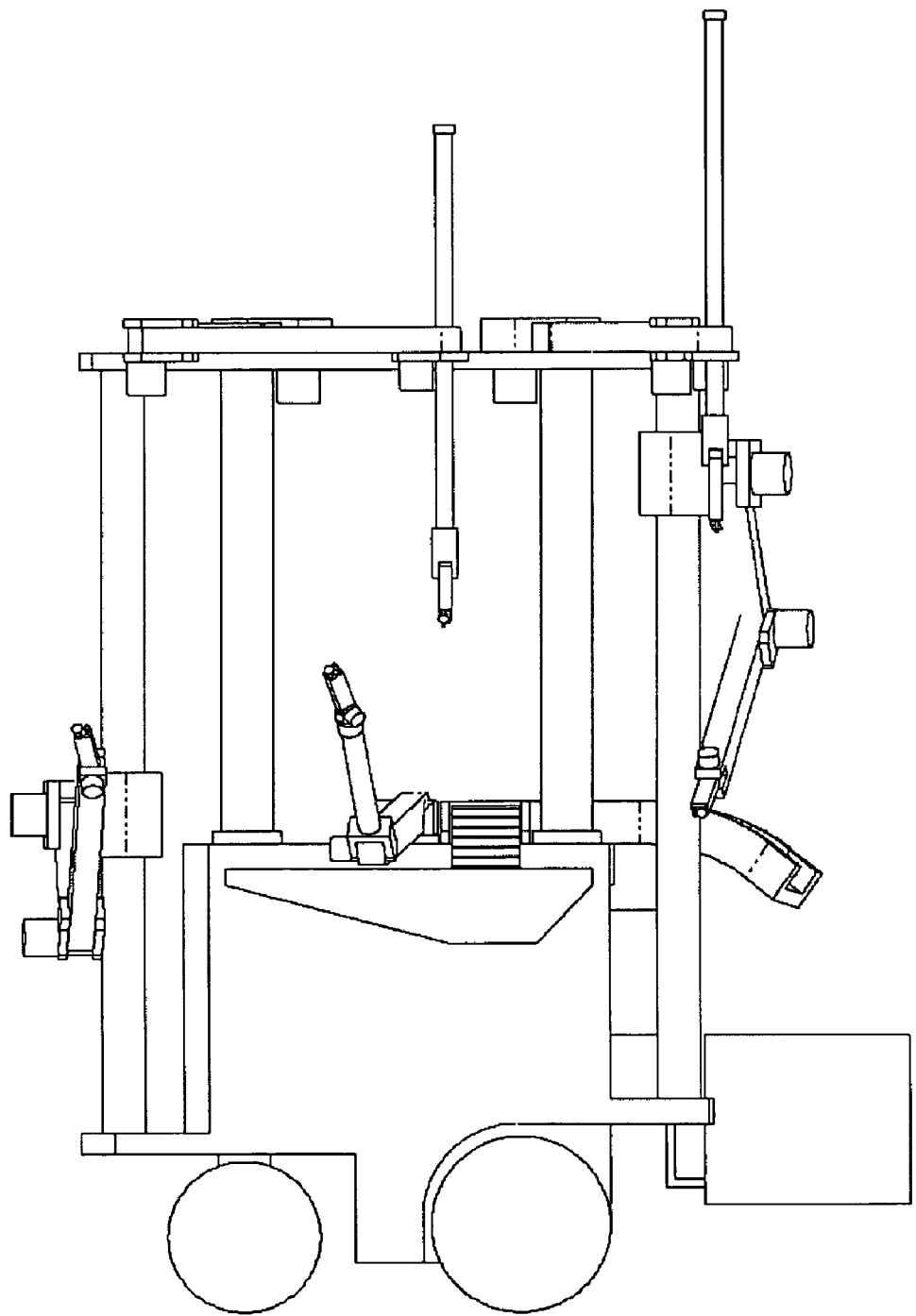
FIG. 9 illustrates a side view of an embodiment of a harvester robot.

FIG. 7 shows an alternate embodiment of a harvest robot. This embodiment comprises an eight arm harvester. A rear mounted "Boom" comprises multiple arms that are mounted higher than front mounted Booms. Each Boom may be raised or lowered which in turn moves any arms coupled to the Boom up or down simultaneously. During harvesting, the bins are placed in the rows approximately as they are expected to be consumed. The robot picks up the empty bin and loads it onto the base platform, which is designed to hold 2-4 to account for the actual yields in the field. Because of the size of the robot base, this harvester model has lower front arms. This model also shows the concept of embedded arms, where two arms are mounted on each boom as described above. FIG. 8 shows a front view of an embodiment of a harvester robot and FIG. 9 shows a side view of an embodiment of a harvester robot for completeness.

Figure 3:
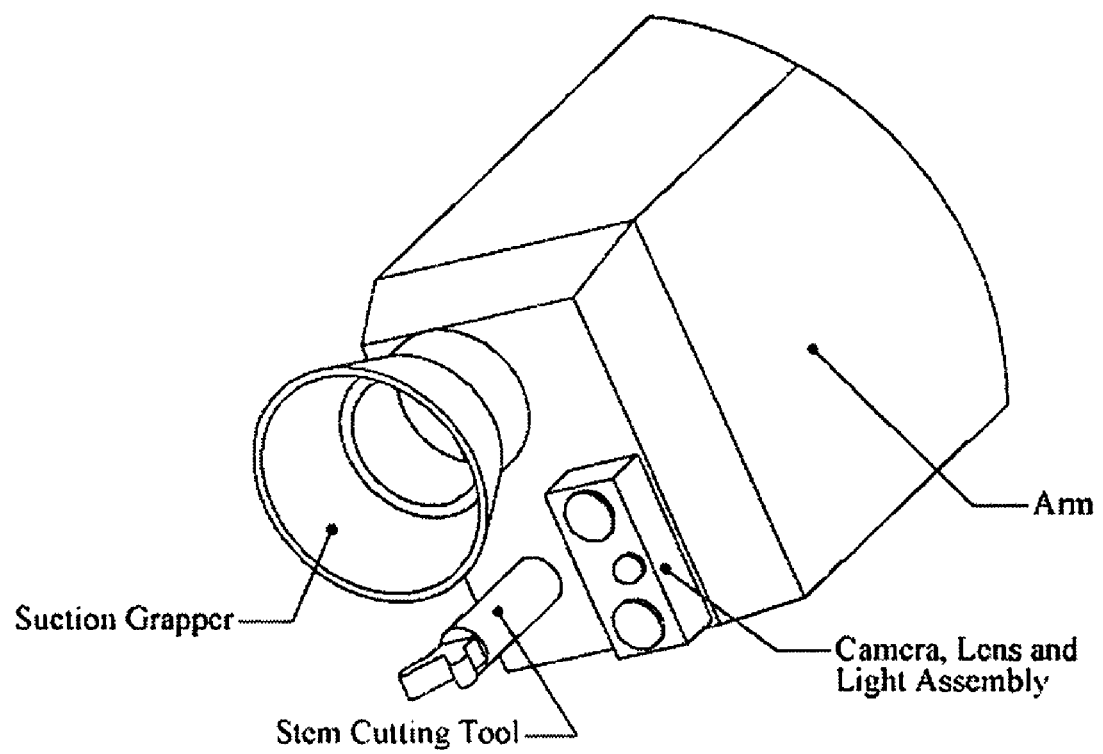
FIG. 3 illustrates an embodiment of a robotic hand.

FIG. 3 illustrates an embodiment of a robotic hand. The hand includes a camera and light system to locate and track each piece of fruit as it is picked even the fruit located inside the dark interior of some plants. The grabbing mechanism labeled as "Suction Grabber" may either be a suction cup with an internal vacuum pump as shown or any other grabbing mechanism capable of picking fruit. For fruit whose stems must be cut rather than being pulled off the plant, the hand linkage may comprise an extendable cutter shown as "Stem Cutting Tool".

Once the fruit is picked, the arms deposit the fruit into the "handling system" as illustrated in FIG. 2. The main purpose of the handling system is to transfer the fruit from the arms to the "harvest bin" or bins. The system may also include secondary operations such as a station to wash the fruit or one to trim the stems to a required length. Finally, the handling system deposits the fruit in the crop appropriate bin. In an alternative embodiment, the picking arms may have a hollow center or a tube attached for the picked fruit to roll gently through to the collecting bin.

In addition to filling the hauling bins with the picked fruit, the harvester is configured to pick-up, position, fill and set down the bins. Large, robust fruit is loaded into large bins possibly requiring forklifts to move. The harvester shown in FIG. 2 includes a forklift for picking up bins labeled as "Forklift for Carrying Bins". As with hand labor, a shipping crew places the empty bins where required and picks up the loaded bins in each row for example at the end of the day. The robot picks up a bin, which it loads while harvesting. When the bin is full, the robot lowers it onto the ground and retrieves another bin that had been placed in the field.

In an alternate embodiment the harvester starts by loading 2-3 bins onto the forklift. The robot lowers the bottom bin into the filling position and raises the rest above the handling system. As the robot harvests, it fills the bin and then sets it down on the ground for collection for example at the end of the day. After setting down a filled bin the harvester then repositions an empty bin in the fill position. When it runs out of bins, the harvester moves to the next area where bins are stored and loads the next set of bins.

Figure 4:
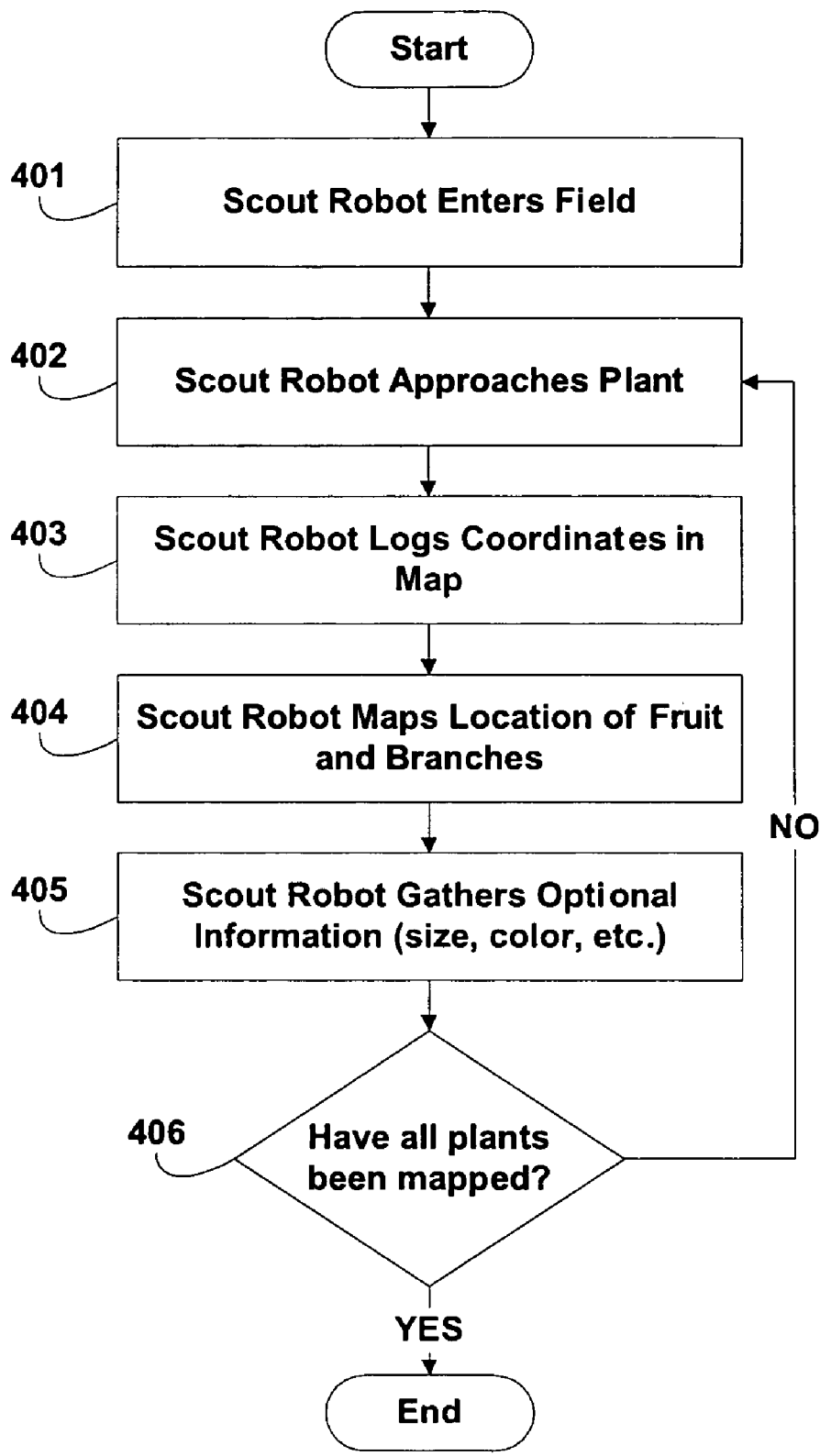
FIG. 4 illustrates an embodiment of a method of mapping locations of plants and fruit via a scout harvester.

FIG. 4 illustrates an embodiment of a method of mapping locations of plants and fruit via a scout harvester. As one skilled in the art of object oriented design patterns will recognize, a design pattern known as a "strategy pattern" may be employed in order to provide dynamic use of alternative strategies without requiring reprogramming or alteration of the software utilized in embodiments of the invention. This may occur for example when a weather system approaches a field and the strategy of waiting for optimal ripeness for harvesting in multiple passes is jettisoned in favor of a pick all fruit immediately strategy in order to save as many agricultural elements as is possible from frost or hail. Any other external event such as a spike in the options market for a given agricultural element may invoke downloads of a new strategy pattern to the robots in the field. Other environmental conditions such as a threshold of a hydration sample or a Brix reading from a refractometer may be used to switch strategies in one or more robots within the field. Any other event that may alter the strategy for scouting or picking a field may be used to employ an alternate strategy that may be dynamically loaded and utilized by the robots in the field in keeping with the spirit of the invention. The robot is configured to delineate the field. For example, coordinates for the corners of the field can be provided to the robot or visible landmarks such as posts or fences can be used for this purpose. The scout begins by entering the field at 401 and approaching the first plant at 402. The robot then logs either its position relative to a landmark or its GPS coordinates in the map at 403. Any other method of determining a position is in keeping with the spirit of the invention. The scout then moves around the plant looking at the exterior with both the cameras mounted on the platform and/or those on the arms at 404. While it is examining the plant, it is looking for fruit and thick branches. This information is used to determine areas where both the scouting and harvesting arms may be moved inside the canopy of the plant. The scouting arms may then moved into the canopy of the tree to map the fruit on the inside of the plant. For plant types with fruit exclusively on the outside of the plant such as a tomato plant, this step may not be performed. In addition, the scout may gather information such as the size or ripeness of each piece of fruit at 405.

When the scout completes the map for the first plant, it moves down the row to explore the next. This process continues until the determination whether all the plants in the field have been mapped at 406. This process may utilize multiple scouts that may or may not communicate with a central server or with the other scouts in order to divide and conquer the mapping area. Once a field is mapped that map is saved for future use, either in the same or successive growing seasons. The scout is configured to update the map for removed or added plants.

Figure 5:
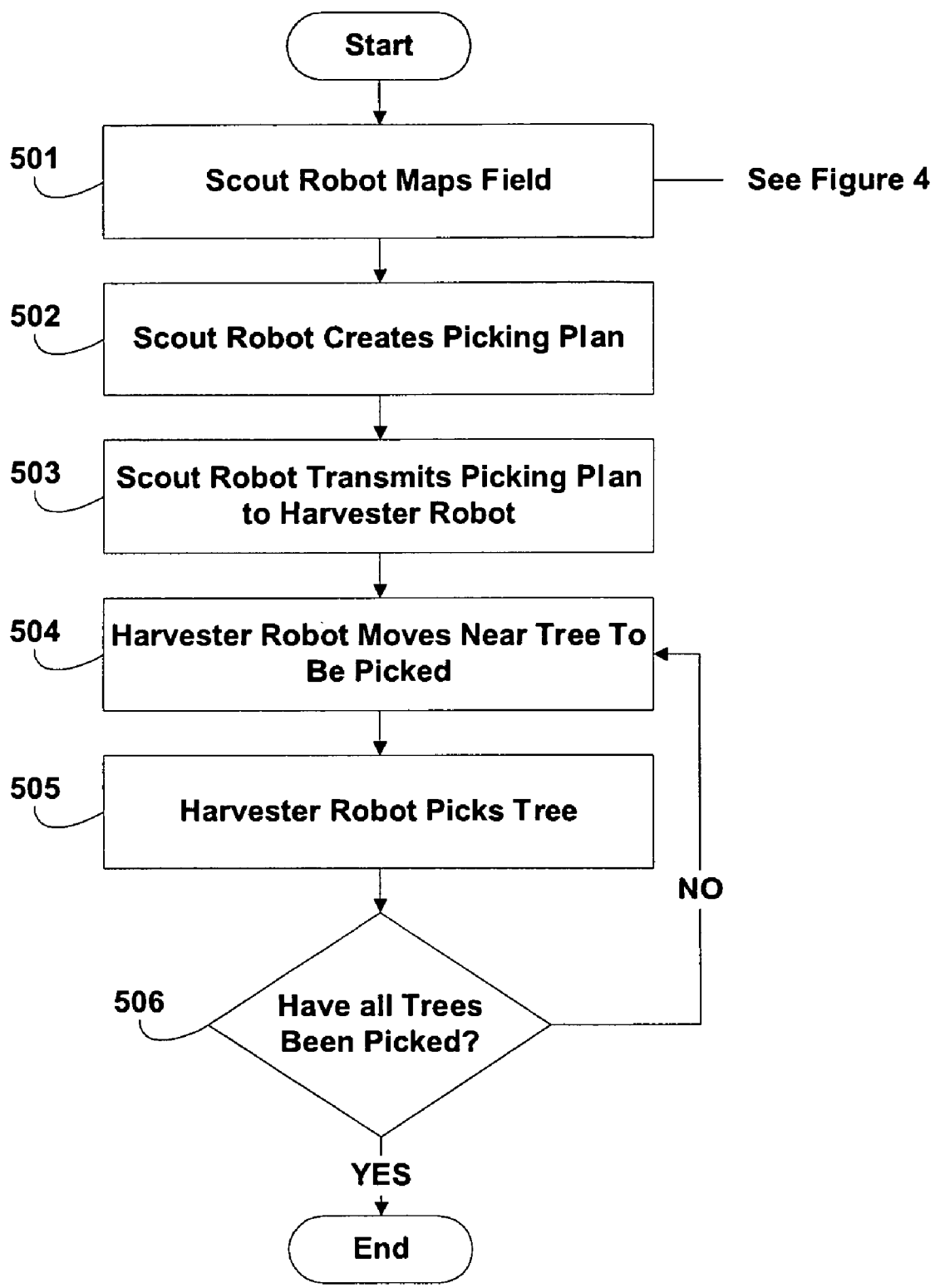
FIG. 5 illustrates an embodiment of a method of harvesting fruit with a harvester robot using a picking plan generated via a scout robot.

FIG. 5 illustrates an embodiment of a method of harvesting fruit with a harvester robot using a picking plan generated via a scout robot. First the scout maps the field at 501 as per FIG. 4. From the map, the scout creates a picking plan that includes the harvester robot's path of travel through the field with details including the locations where the harvester is to stop around each plant at 502. The plan may include the order of fruit to pick with each arm and the approximate arm motions to reach each piece. Once the plan is complete, the scout transmits it to the appropriate harvester at 503 (or to a server). Alternatively, the scout robot may merely transmit the map to a harvest robot or server where the picking plan is calculated and coordination between a plurality of harvest robots is performed. Use of the system without a centralized server comprises a peer-to-peer architecture. The peer-to-peer architecture may be used in order to balance processing loads of the various robots depending on their current work load in order to most efficiently utilize their associated computing elements. Any algorithm for a picking plan may be used in the strategy pattern in keeping with the spirit of the invention.

When it is time to pick that field the harvester implements the picking plan to harvest the fruit. It positions itself as directed around each plant at 504. It then moves its arms to locate the fruit as directed in the plan. Once the hand is looking approximately at the target location, the camera on the hand locates and picks the fruit at 505, for example in one embodiment of the strategy pattern, the easiest piece of fruit to harvest. The arm is positioned to pick the next piece of fruit in the bunch, then it moves to the next fruit location and the process continues until the entire plant is harvested. In one embodiment of the strategy pattern after picking a piece of fruit for example the distance of the fruit from the core of the tree may be utilized to estimate the amount of height gained by the remaining pieces of fruit in a cluster as the branches farther away from the center of the tree may be smaller for a given tree type and therefore exhibit a relationship of group location as a function of distance from the center of the plant.

Once the first plant is harvested, the harvester moves itself to the proper position near the second plant and the harvesting process is repeated. This continues until the determination is made whether the entire field is harvested at 506. Alternatively, the scout may transmit the picking for each tree to the harvester after mapping each tree changing the target of the "NO" event originating from 506 to 502 instead of 504.

Figure 6:
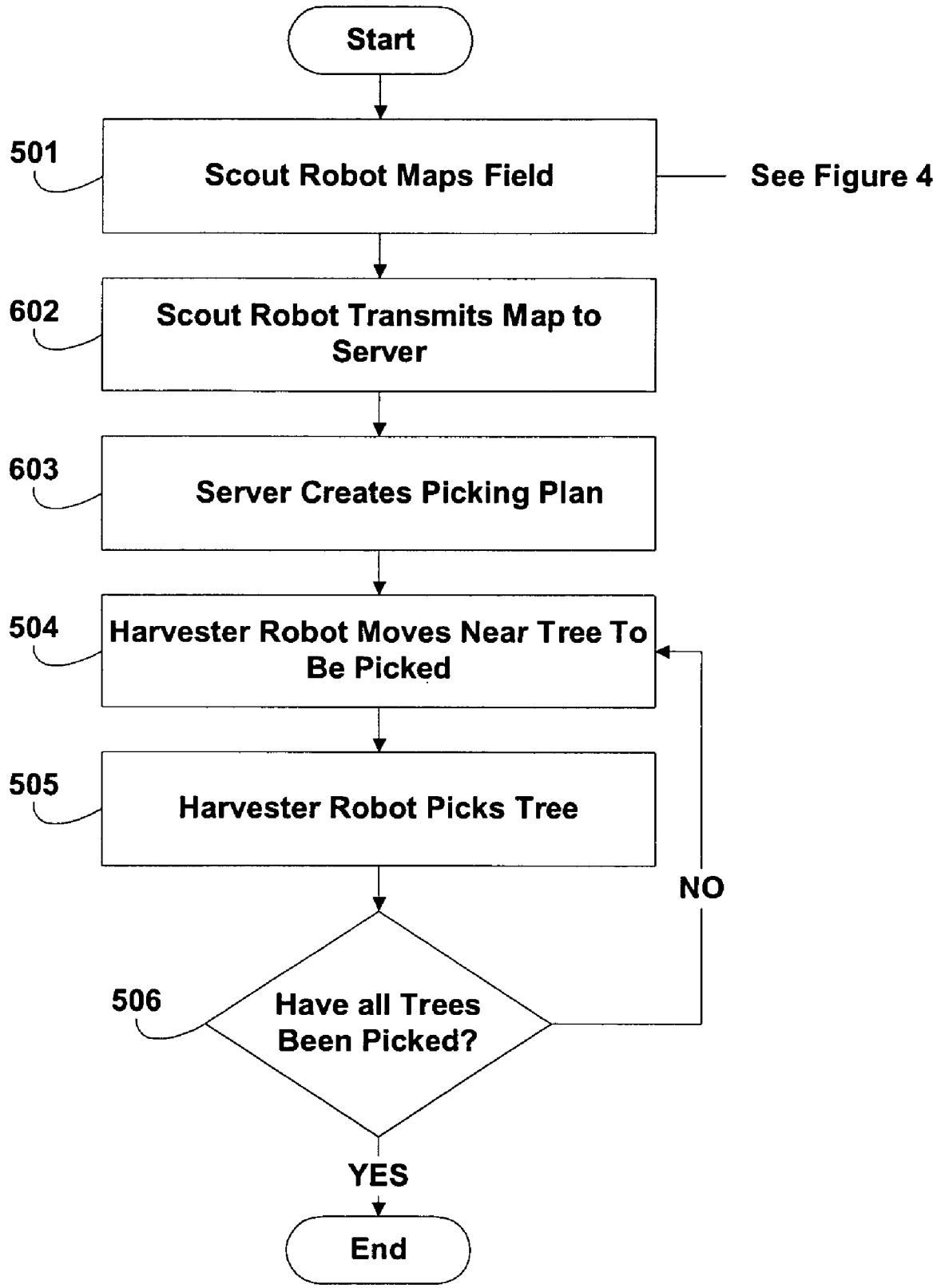
FIG. 6 illustrates an embodiment of a method of harvesting fruit with a harvester robot using a picking plan generated via a server using a map created by a scout robot.

FIG. 6 illustrates an embodiment of a method of harvesting fruit with a harvester robot using a picking plan generated via a server using a map created by a scout robot. First the scout maps the field at 501 as per FIG. 4. From the map, the scout transmits the map to a server at 602. The server creates a picking plan that includes the harvester robot's path of travel through the field with details including the locations where each harvester is to stop around each plant. The plan may include the order of fruit to pick with each arm and the approximate arm motions to reach each piece. Once the plan is complete, the server transmits it to the appropriate harvester at 603. Alternatively, the scout robot may merely transmit the map to a harvest robot where the picking plan is calculated and coordination between a plurality of harvest robots is performed. Use of the system without a centralized server comprises a peer-to-peer architecture. The peer-to-peer architecture may be used in order to balance processing loads of the various robots depending on their current work load in order to most efficiently utilize their associated computing elements. Any algorithm for a picking plan may be used in the strategy pattern in keeping with the spirit of the invention.

When it is time to pick that field the harvester implements the picking plan to harvest the fruit. It positions itself as directed around each plant at 504. It then moves its arms to locate the fruit as directed in the plan. Once the hand is looking approximately at the target location, the camera on the hand locates and picks the fruit at 505, for example in one embodiment of the strategy pattern, the easiest piece of fruit to harvest. The arm is positioned to pick the next piece of fruit in the bunch, then it moves to the next fruit location and the process continues until the entire plant is harvested. In one embodiment of the strategy pattern after picking a piece of fruit for example the distance of the fruit from the core of the tree may be utilized to estimate the amount of height gained by the remaining pieces of fruit in a cluster as the branches farther away from the center of the tree may be smaller for a given tree type and therefore exhibit a relationship of group location as a function of distance from the center of the plant.

Once the first plant is harvested, the harvester moves itself to the proper position near the second plant and the harvesting process is repeated. This continues until the determination is made whether the entire field is harvested at 506. Alternatively, the scout may transmit the picking for each tree to the harvester after mapping each tree changing the target of the "NO" event originating from 506 to 602 instead of 504.

Thus embodiments of the invention directed to an Robotic Mechanical Picker System and Method have been exemplified to one of ordinary skill in the art. The claims, however, and the full scope of any equivalents are what define the metes and bounds of the invention.

What is claimed is:

1. An agricultural robot system comprising:
    a scouting robot programmed to autonomously scouting an agricultural field without operator intervention comprising:
        a platform;
        at least one drive wheel coupled with said platform;
        at least one camera coupled with said scouting robot wherein said scouting robot utilizes said at least one camera to scout objects in said agricultural field;
    a harvesting robot programmed to autonomously harvesting the agricultural field without said operator intervention comprising:
        at least one arm;
    wherein said scouting robot is programmed to scout a first plant in said agricultural field, and wherein said scouting robot is programmed to move to a second plant not within reach of said first plant in said agricultural field, and scout said second plant in said agricultural field to create a map of agricultural elements comprising locations of said first plant and said second plant and locations of fruit in said first plant and said second plant in said agricultural field wherein said scouting robot does not perform an agricultural operation that transforms said agricultural elements within said agricultural field or otherwise harvest said agricultural field while said scouting robot creates said map;
    at least one computer that is programmed to generate a picking plan from said map created by said scouting robot comprising locations of said first plant and said second plant and locations of fruit in said first plant and said second plant wherein said picking plan comprises a harvesting robot motion path and locations to position said harvesting robot that increases efficiency of said harvesting robot and wherein said picking plan comprises an order in which to pick fruit at said locations of fruit and wherein said picking plan comprises said at least one arm of said harvesting robot to pick said fruit at said locations of fruit and wherein said picking plan minimizes a risk of entanglement of said at least one arm of said harvesting robot and minimizes the number of movements of said at least one arm of said harvesting robot and minimizes last looks and back tracks of said harvesting robot and wherein said picking plan is generated before said first plant is harvested by said harvesting robot; and,
    wherein said harvesting robot is programmed to perform an agricultural operation to pick said fruit at said first plant and said second plant to harvest said agricultural field according to said picking plan and after said picking plan is received from said at least one computer.

2. The system of claim 1 further comprising a communications device.

3. The system of claim 1 further comprising a sensor.

4. The system of claim 3 wherein said sensor comprises a refractometer.

5. The system of claim 3 wherein said sensor comprises a hydration sensor.

6. The system of claim 1 further comprising at least one harvester bin.

7. The system of claim 1 further comprising wherein said at least one computer comprises at least one server.

8. The system of claim 7 wherein said scouting robot is programmed to transfer said map of agricultural elements to said at least one server wherein said at least one server is programmed to create said picking plan for agricultural elements in said field.

9. The system of claim 1 wherein said at least one camera is coupled with said platform.

10. The system of claim 1 wherein said at least one camera produces a plurality of images that are processed by an optical flow algorithm.

11. The system of claim 6 wherein said harvesting robot is programmed to process an agricultural element after it is picked.

12. The system of claim 11 wherein said process comprises cleaning.

13. The system of claim 11 wherein said process comprises packaging.

14. The system of claim 11 wherein said process comprises stem removal.

15. The system of claim 1 wherein said picking plan is configured as a strategy pattern functional element that may be dynamically altered.

16. The system of claim 1 wherein said picking plan is altered as a result of weather.

17. The system of claim 1 wherein said map is stored in an agricultural database and comprises agricultural element health.

18. The system of claim 1 wherein said map is stored in an agricultural database and comprises environmental status of a field.

19. The system of claim 1 wherein an agricultural database generated via said scouting robot is used to estimate crop yield.

* * * * *